April 24, 1962  M. PICARD  3,030,992
FOOD CUTTING MACHINE
Filed June 7, 1961  2 Sheets-Sheet 1
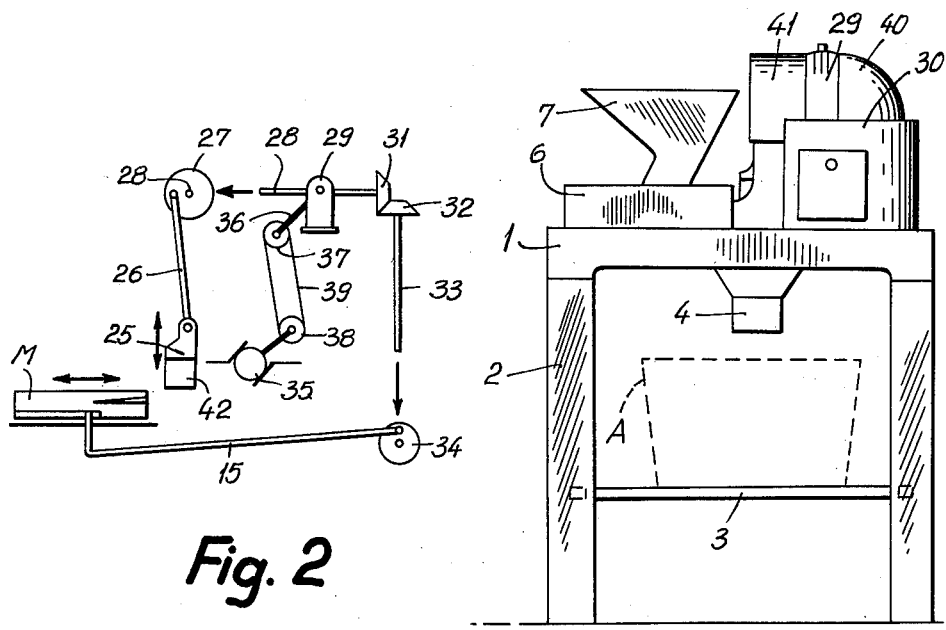
Fig. 2
Fig. 1
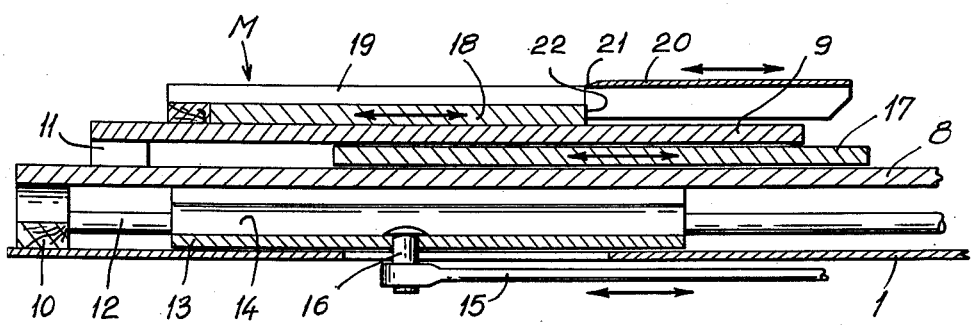
Fig. 3
INVENTOR
Martial PICARD
BY
AGENT April 24, 1962  M. PICARD  3,030,992

FOOD CUTTING MACHINE

Filed June 7, 1961  2 Sheets-Sheet 2

INVENTOR
Martial PICARD
BY Pierre Lespérance
AGENT

United States Patent Office 3,030,992
Patented Apr. 24, 1962

3,030,992
FOOD CUTTING MACHINE
Martial Picard, Ste. Louise, Quebec, Canada, assignor to Charles Eugene Bouchard, Ste.-Anne-de-la-Pocatiere, Quebec, Canada
Filed June 7, 1961, Ser. No. 115,395
6 Claims. (Cl. 146—78)

The present invention relates to a power operated machine for cutting food and more specifically vegetables and the like, into cubes or dices, or into sticks.

More particularly, the present invention relates to a machine for slicing vegetables and which further cuts the vegetable slices into dices or sticks.

The general object of the present invention resides in the provision of a machine of the character described which is of compact size, is operated by an electric motor and is adapted to be used by restaurants, hotels, hospitals, and other institutions where it is necessary to cut vegetables and the like at a rapid and efficient rate and with a minimum of work.

A more specific object of the present invention resides in the provision of a machine of the character described in which the vegetables to be cut are fed into a stationary funnel or hopper which is easily accessible at the upper part of the machine and in which the cut vegetables are automatically discharged by a funnel disposed under the machine.

Another object of the invention resides in the provision of a machine of the character described in which the different parts coming in contact with the vegetables can be easily cleaned and maintained in sanitary condition.

Another object of the invention consists of a machine of the character described in which it is only necessary to change one part to change from the dicing operation to the operation of cutting into sticks.

The foregoing and other important objects of the present invention will become more apparent during the following disclosure, and by referring to the drawings, in which:

FIGURE 1 is a side elevation of the machine of the invention;

FIGURE 2 is a schematic view of the means for actuating the several movable parts of the machine;

FIGURE 3 is a longitudinal section on an enlarged scale of the assembly for slicing the vegetables and for feeding the slices to the dicing assembly;

In the annexed drawings, the same reference characters indicate the same elements throughout.

Figure 7:
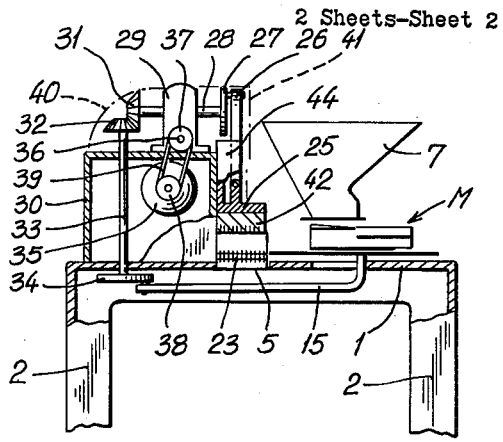
FIGURE 7 is a sectional elevation of the machine.

The machine in accordance with the invention comprises a table 1 having ground engaging legs 2 to which is secured a shelf 3 mounted underneath the table 1 for supporting a container A, such as a pail and the like, in a position for receiving the diced vegetables or vegetables in sticks discharged by the outlet funnel 4 secured underneath the table in register with opening 5 made in said table 1 (see FIGURE 7). A housing 6 to the top of which is rigidly secured a feeding funnel 7 is hinged on one side thereof to the table 1 such that the housing 6 and funnel 7 may be pivoted laterally of the table in order to uncover the mechanism M for slicing the vegetables and generally shown in FIGURE 3.

Mechanism M comprises two stationary horizontal superposed spaced plates 8 and 9 secured on top of table 1 by means of legs 10 and 11 respectively. Guiding rods 12 are horizontally disposed between the lower plate 8 and the table 1 and serve to guide a carrier plate 13 in a horizontal reciprocating movement, this carrier plate 13 being provided with grooves 14 of semi-circular cross-section on the longitudinal sides thereof for slidably receiving the guide rods 12.

Figure 4:
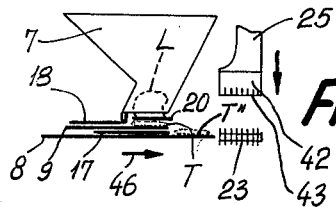
FIGURES 4 and 5 are schematic side elevations of the machine in two stages of its operation.

Carrier plate 13 is actuated in its back and forth movement by a crank rod 15 pivoted at 16 to the carrier plate 13. A lower reciprocating plate 17 is horizontally disposed between the two stationary plates 8 and 9 and is securely fixed to carrier plate 13 while an upper reciprocating plate 18 lies on the top face of upper stationary plate 9 and is also secured to carrier plate 13. The upper reciprocating plate 18 is secured to a frame 19 surrounding the rear end and the sides thereof and extended forwardly of plate 18 to support a cutting blade 20, the cutting edge 21 of which is rearwardly disposed and just above the forward edge 22 of upper reciprocating plate 18. In the rearmost position of the carrier plate 13, reciprocating plates 17 and 18 and of the blade 20, as shown in FIGURE 4, the blade 20 closes the lower opening of funnel 7. The upper reciprocating plate 18 completely uncovers this funnel opening and the lower reciprocating plate 17 has its forward part in register with the funnel opening. The upper stationary plate 9 also extends forwardly in register with the funnel opening while the lower stationary plate 8 extends forwardly to terminate at the dicing frame 23 provided with a grid of vertically disposed cutting blades 24 arranged in two groups at right angles to one another. Said blades 24 form square openings between themselves and are disposed in register with the table opening 5.

A plunger 25 is guided in a vertical reciprocating movement by grooved upright channel member 44 and is actuated by a crank rod 26 pivotally connected to a crank wheel 27 rotating in a vertical plane and secured to horizontal shaft 28 which is the output shaft of a speed reducing device 29 of known construction and which is secured to frame 30, itself mounted on table 1 at the end of the latter opposed to funnel 7. Output shaft 28 is extended opposite crank wheel 27 and a pinion 31 is keyed thereto, said pinion meshing with a second pinion 32 keyed to a vertical shaft 33 rotatably mounted in frame 30 and table 1 and provided under table 1 with a crank wheel 34 rotating in a horizontal plane and to which is pivotally connected the free end of the crank rod 15 pivoted at 16 to the carrier plate 13.

An electric motor 35 is secured to frame 30 and actuates the input shaft 36 of the gear reducer 29 by means of grooved pulleys 37, 38 and belt 39. The driving mechanism just described is enclosed by removable covers 40 and 41.

Figure 8:
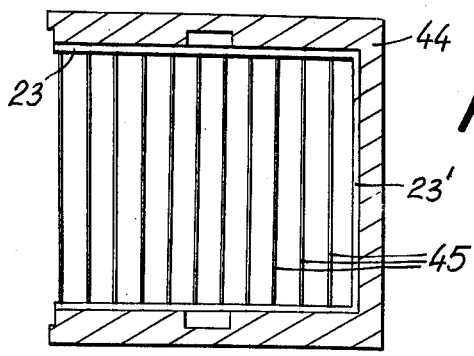
FIGURE 8 is an enlarged plan section of the cutter for cutting these slices into sticks.

The plunger 25 carries at the lower end thereof a removable block 42, the underface of which is provided with square teeth 43 adapted to enter the openings between the blades 24 of the frame 23 and to protrude underneath said blades. When it is desired to cut the vegetables into sticks such as potatoes for making French frieds or the like, the cutting grid 23, 24 is replaced by a cutting grid consisting of a frame 23' provided with blades 45 as shown in FIGURE 8 which are all parallel to one another and vertically disposed and the spacing of which corresponds to the space between the grooves defining the teeth 43 of block 42 in order that said teeth may enter between the blades 45.

Figure 5:
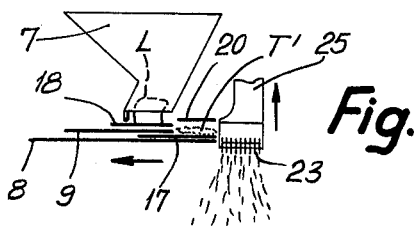
Figure 6:
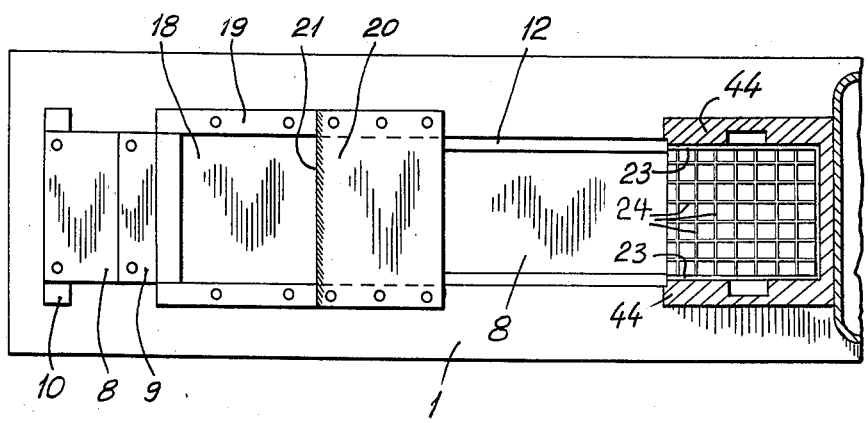
FIGURE 6 is an enlarged top plan view partially in plan section.

The apparatus in accordance with the invention operates as follows:

The carrier plate 13 being in a retracted position, as shown in FIGURE 4, the lowermost vegetable inserted within funnel 7 will rest on the slicer blade 20 which closes the funnel lower opening; during its first forward stroke towards the plunger 25, as indicated by arrow 46 in FIGURE 4, the slicer blade 20 uncovers the funnel opening and the vegetable falls unto the upper movable plate 18 as indicated in FIGURE 5. In the subsequent return stroke of the carrier plate 13, the slicer blade 20 cuts a slice T of the vegetable, which falls on upper stationary plate 9; the vegetable bears against the back wall of the funnel during this slicing operation. In the second forward stroke of the carrier plate 13, the vegetable slice T which rests on the upper stationary plate 9 is pushed forwardly by upper movable plate 18 until it falls forwardly of upper stationary plate 9 unto the lower movable plate 17 to take the position T' shown in FIGURE 5. Upon the next backward stroke of the carrier plate 13, the slice in position T' is maintained in said position because it abuts against the forward edge of upper stationary plate 9. The lower movable plate 17 completely retracts underneath plate 9, whereby the slice falls into position T" shown in FIGURE 4, on top of lower stationary plate 8. In the third forward stroke of the carrier plate 13, the slice in position T" is pushed forwardly by the front edge of the lower movable plate 17 until it takes a position on top of the cutting grid 23 or 23' and during the same movement, the plunger 25 effects a downward stroke whereby its teeth 23 of block 42 will press the slice on grid 23 or 23' against cutter blades 24 or 45 in order to form cubes or dices or to form sticks which pass through table opening 5 and discharge hopper 4 to fall into container A.

The back and forth movements of the slicer mechanism and of the plunger 25 are synchronized and are effected at the same speed whereby at each cycle of the machine, one slice is cut and another one is cut into cubes or sticks. Thus the machine of the invention operates at a fast rate.

Its mechanism is also very simple in construction and is easily repaired and maintained in sanitary condition.

While a preferred embodiment in accordance with the present invention has been illustrated and described, it is understood that various modifications may be resorted to without departing from the spirit and scope of the appended claims.

What I claim is:

1. A machine for cutting vegetables and the like comprising a table, a feeding funnel mounted over said table and having a lower opening, said table having an opening made therethrough spaced forwardly of said funnel opening, a discharge funnel secured underneath said table and in communication with said table opening, a cutting grid carried by said table and in register with said table opening, a vertically reciprocable plunger mounted on said table, a block removably secured to said plunger and provided with teeth for engaging a vegetable slice in a position over said cutting grid and to cut said slice by pressing the same through the spaces between the blades of said cutting grid, and a slicing mechanism including stationary horizontally disposed upper and lower plates spacedly superposed and extending between said funnel opening and said table opening, said lower stationary plate extending up to said cutting grid, said upper stationary plate terminating at the front edge of said feeding funnel opening, a carrier plate mounted for horizontal reciprocating movement on said table and underneath said lower stationary plate, movable upper and lower plates secured to said carrier plate and respectively disposed underneath and on top of said upper stationary plate, said lower movable plate extending forwardly from said upper movable plate, and a horizontally disposed cutting blade secured to said carrier plate and disposed at a higher level than and forwardly of said upper movable plate and having its cutting edge disposed rearwardly and directly over the front edge of said upper movable plate, said cutting blade closing said feeding funnel opening in the rearmost retracted position of said carrier plate and uncovering said feeding funnel opening and disposed forwardly of the latter in the foremost position of said carrier plate, and power means for actuating said plunger and said carrier plate in their respective reciprocating movements.

2. A machine as claimed in claim 1, wherein said cutting grid comprises a frame and a plurality of vertically disposed spaced blades carried by said frame and arranged in two groups at right angles to each other, the blades of each group being parallel and equally spaced between themselves in order to define square spaces between the blades.

3. A machine as claimed in claim 1, wherein said cutting grid comprises a frame and a plurality of spaced parallel vertically disposed blades carried by said frame.

4. A machine as claimed in claim 1, including horizontally disposed guiding rods above said table rearwardly of said cutting grid, said carrier plate being provided with lateral grooves in sliding engagement with said guiding rods.

5. A machine as claimed in claim 1, wherein said power means include an electric motor, a speed reducer, crank wheels actuated by said speed reducer and crank rods connected to said crank wheels and to said carrier plate and said plunger for reciprocating said carrier plate and plunger.

6. A machine as claimed in claim 1, wherein said feeding funnel is secured to a housing which is itself hinged to said table and encloses said slicing mechanism, and is pivotable to uncover said slicing mechanism.

References Cited in the file of this patent

UNITED STATES PATENTS

| | | |
|---|---|---|
| 223,809 | Lintner | Jan. 27, 1880 |
| 1,354,263 | Miller et al. | Sept. 28, 1920 |